Patented Aug. 10, 1954

2,686,156

UNITED STATES PATENT OFFICE 2,686,156

PREPARATION OF STABLE MOLYBDENUM DISULFIDE LUBRICANTS

Clyde E. Arntzen, Turtle Creek, and Paul E. Dupler, Pittsburgh, Pa., assignors to Westinghouse Electric Corporation, East Pittsburgh, Pa., a corporation of Pennsylvania No Drawing. Application December 8, 1951, Serial No. 260,756

5 Claims. (Cl. 252—25)

This invention relates to stable solid lubricants and, in particular, to powdered molybdenum disulfide lubricants.

It has been proposed heretofore to prepare solid lubricants comprising highly purified, powdered molybdenum disulfide. Patent No. 2,367,946 is an example of such prior practice. However, it has been discovered that under certain circumstances, pure molybdenum disulfide powder is affected by moisture or highly humid atmospheres with the evolution of slight amounts of acids, which have been determined to comprise sulfuric acids and possibly sulfurous acid as well. Therefore, molybdenum disulfide even if prepared in a highly purified state, when allowed to come in contact with humid atmospheres or in contact with water, develops a proportion of such acids, and when applied to metallic bearings, the acids have been found to impair the proper functioning of such bearings.

The object of this invention is to provide a stable powdered solid lubricant from finely divided purified molybdenum disulfide.

A further object of the invention is to provide for applying to particles of finely divided molybdenum disulfide an extremely small amount of an oily liquid which will prevent reaction with moisture and thus prevent the formation of acids.

Other objects of the invention will in part be obvious and will in part appear hereinafter.

We have discovered a method of producing a stable powdered solid lubricant from finely divided, purified molybdenum disulfide in which the particles of the molybdenum disulfide are coated with an extremely small amount of an oily organic liquid of the nature of petroleum oil, whereby the molybdenum disulfide for all practical purposes is a dry powder and retains all of its excellent lubricating properties, but possesses a resistance to deterioration in the presence of moisture or highly humid atmospheres so that acids are not produced therein.

The process of this invention may be applied either to highly purified molybdenum disulfide, such as is produced in accordance with Kaercher Patent No. 2,367,946 or by other processes, or to molybdenite that may contain small amounts of impurities, such as silica or silicates, that would render the material unsuitable for use as a solid lubricant. If a molybdenite material with small amounts of silica or silicates present is to be converted to a lubricant, it is necessary, first, to eliminate the silica and silicates therefrom. A convenient process is to admix with finely divided molybdenite, preferably of a fineness to pass a sieve having 100 mesh as to the lineal inch, with sufficient of an alkali metal fluoride such as $KHF_2$ or $NaHF_2$ to react with all of the silicate that may be present. The mixture is then calcined at a red heat, that is at a temperature of between 900° F. and 1200° F. At this temperature a reaction between the alkali metal fluoride and the silica takes place, producing volatile silicon tetrafluoride which escapes, leaving alkali metal oxides and other water soluble oxides admixed with the main body of the molybdenum disulfide. The calcining reaction should be carried out with a flow of inert gas, such as nitrogen, passing over the reaction mass in order to remove the silicon fluoride gases and to prevent oxidation of the molybdenum disulfide. Upon cooling the residue is washed with water in order to dissolve out the alkali metal oxides and other water soluble residues, thereby leaving a substantially pure molybdenum disulfide product. The calcination also eliminates other volatile materials besides the silicates. Thus, any oils and volatile solid impurities are eliminated.

The purified molybdenum disulfide resulting from the calcination and washing treatments or a relatively pure molybdenum disulfide derived from any other process, will react with moisture to produce acids. We have tested a number of such highly purified powders that were merely exposed to the atmosphere for a number of days, and substantial amounts of acid have been found therein. The powders have an initial acid number of approximately 2.5. Under high humidity conditions, such as may be normally expected in summer, acid numbers of from 7 to 9 have been found after the molybdenum disulfide powder has been exposed to the air for about 30 days. We have found that in order to secure the best lubricant, the acid number of the molybdenum disulfide should at no time exceed 2.0 and preferably be of a value of 1.0 or less.

In order to render the highly purified molybdenum disulfide stable in contact with moisture and highly humid atmospheres, the following treatment is applied thereto. One hundred parts by weight of the finely divided purified molybdenum disulfide having less than 0.05% by weight of silica or silicate therein is thoroughly admixed with at least 30 parts by weight of an organic liquid composition having a density of 1.0, the organic liquid composition comprising essentially 95% by weight of a readily volatilized organic solvent and the balance being a non-volatile oily liquid such as a petroleum oil dissolved in the solvent. For liquid compositions having a density other than 1.0, the appropriate minimum weight to be applied to each 100 parts by weight of the molybdenum disulfide is obtained by multiplying 30 by the density of the composition or, conversely, the weight divided by its density equals 30. Thus, for a toluene composition having a density of 0.86, the minimum amount will be 26 parts by weight. The amount of the liquid composition may greatly exceed this minium value. We have used with good results amounts of the liquid composition equal to as much as six times the weight of the molybdenum disulfide. We prefer to apply to each 100 parts by weight of the molybdenum disulfide between 150 and 200 parts by weight of the liquid composition.

The mixture of molybdenum disulfide and liquid composition is stirred vigorously for a period of time of several minutes; then the stirring is terminated and the molybdenum disulfide particles are permitted to settle out of the organic liquid composition. The supernatant organic liquid composition is decanted to leave a mud-like residue comprising slightly less than 30 parts by weight of the liquid composition and 100 parts by weight of the molybdenum disulfide. The muddy residue is then heated to evaporate therefrom the organic solvent. In some cases the mixture may be filtered through a very fine filter paper to separate the excess liquid from the molybdenum disulfide. The wet residue on the filter paper may then be dried. The result is a dry powder that comprises the finely divided molybdenum disulfide with at least 0.05% by weight and less than 2% by weight of the oily liquid distributed over the surface of the particles. This amount of the oily liquid is not observable, and the molybdenum disulfide otherwise appears very similar to the original material before treatment. However, the resulting material when tested for acidity even after exposure to highly humid atmospheres for three weeks has an acid number of less than 1. Admixing oil directly with the molybdenum disulfide does not produce a satisfactory product.

The treated molybdenum disulfide after drying to remove the solvent is loosely agglomerated into lumps. By passing the product through a screen having 20 meshes to the lineal inch the lumps readily break up. Any mechanical stirring or rubbing will easily reduce the product to a fine powder again.

The organic liquid composition is preferably prepared from a volatile organic solvent having a low boiling point, a viscosity of less than 5 centipoises at 20° C., and which will evaporate without cracking or the deposition of a residue. Examples of suitable solvents for this purpose are xylene, acetone, amyl acetate, butyl alcohol, chloroform, ethyl alcohol, propyl acetate, toluene, turpentine, carbon disulfide and mixtures of any two or more.

The oily liquid may comprise a petroleum oil, for example, a refined oil of a viscosity of from 10 to 100 centistokes at 25° C., or a silicone oil, or a synthetic ester lubricant such as dioctyl sebacate, tributyl phosphate and the complex esters described in Patent 2,499,984, or mixtures of these. The oily liquid should be inert, having a boiling point at atmospheric pressure of over 250° C. and a vapor pressure of less than 1 mm. of mercury at 50° C.

The following examples are illustrative of the practice of the invention:

*Example I*

One hundred parts by weight of molybdenum disulfide, ball milled to a fineness so that 90% passes through a sieve having 300 meshes to the lineal inch, is admixed with 170 parts by weight of a composition comprising 98% by weight of xylene and 2% by weight of a highly refined petroleum oil of a viscosity of 65 centistokes at 25° C. The liquid composition and the molybdenum disulfide is thoroughly stirred for 30 minutes and then permitted to stand in a vessel for 3 hours until substantially all of the molybdenum disulfide particles settle out. Approximately 140 parts by weight of the supernatant liquid composition are decanted. Thereafter, the molybdenum disulfide residue is placed in flat trays in an oven and heated to 150° C. for several hours. The dry product is easily passed through a sieve having 20 meshes per lineal inch by rubbing with a spatula.

The resulting powder of Example I was exposed to an atmosphere having a relative humidity of 90%. In the same chamber, a sample of the original untreated molybdenum disulfide powder was similarly exposed to the atmosphere. The original acidity of the untreated molybdenum disulfide was that such it exhibited an acid number of 2.4. After 22 days the acid number of the untreated material was 4.1 and in 36 days 7.4. The molybdenum disulfide produced in accordance with this example had an original acid number of 0.2, which increased to 0.7 after 22 days in the chamber and in 36 days had a value of 1.5.

*Example II*

One hundred parts by weight of molybdenum disulfide of a fineness so that at least 90% passes through a sieve having 300 meshes to the lineal inch is admixed with two hundred parts of a solution comprising 99% by weight of toluene and 1% by weight of a mineral oil having present therein 1%, based on the weight of the oil, of ditert butyl methyl phenol as an inhibitor. The powder is thoroughly admixed with the solution and then permitted to settle for 12 hours, after which time approximately 170 parts of supernatant liquid is decanted. The residue is placed in pans and the toluene is evaporated by heating. The resulting powder is similar in appearance and functioning to the original untreated material. However, when exposed to highly humid atmospheres the treated material will not develop an acidity equal to an acid number of 1 after several weeks, whereas the original material will have an acid number of 4.1 after three weeks.

The liquid organic solvent performs the function of removing acids that are present initially in the molybdenum disulfide to an amount such that the acid number of the treated molybdenum disulfide is less than 1. The decanted or filtered liquid composition carries away the acids and therefore a substantial excess of the liquid composition beyond that required to wet the molybdenum disulfide is preferred.

Since certain changes may be made in the above invention and different embodiments may be made wtihout departing from the scope thereof, it is intended that all matter contained herein shall be interpreted as illustrative and not in a limiting sense.

We claim as our invention:

1. In the process of preparing a stable powdered solid lubricant from finely divided, purified molybdenum disulfide, the steps comprising thoroughly admixing 100 parts by weight of the finely divided, purified molybdenum disulfide with sufficient parts by weight of an organic liquid composition so that the parts by weight thereof divided by its density is at least 30, the organic liquid composition comprising essentially 95% to 99.5% by weight of a readily volatilized organic solvent and the balance being a relatively non-volatile oily liquid dissolved in the solvent, the oily liquid being selected from the group consisting of petroleum oil, silicone oil and liquid esters having a boiling point of over 250° C. and a vapor pressure of less than 1 mm. at 50° C., terminating the admixing, separating excess liquid composition from the finely divided molybdenum disulfide, to leave a residue of the finely divided molybdenum disulfide and a small amount of the liquid composition, and evaporating the organic solvent from the residue, thereby producing a dry powder comprising the finely divided molybdenum disulfide with at least 0.05% and less than 2% by weight of the oily liquid present on the particles thereof to maintain its stability when exposed to moisture.

2. In the process of preparing a stable powdered solid lubricant from finely divided, purified molybdenum disulfide, the steps comprising thoroughly admixing 100 parts by weight of the finely divided, purified molybdenum disulfide with sufficient parts by weight of an organic liquid composition that the parts by weight divided by its density equals at least 30, the organic liquid composition comprising essentially 95% to 99.5% by weight of a readily volatilized organic solvent and the balance being petroleum oil dissolved in the solvent, terminating the admixing and settling out the finely divided molybdenum disulfide, decanting the organic liquid composition to leave a residue of a small portion of the liquid composition and the finely divided molybdenum disulfide, and evaporating the organic solvent from the residue, thereby producing a dry powder comprising the finely divided molybdenum disulfide with at least 0.05% and less than 2% by weight of the petroleum oil present on the particles thereof to maintain its stability when exposed to moisture.

3. In the process of preparing a stable powdered solid lubricant from a molybdenite concentrate, the steps comprising calcining at a red heat a mixture of finely divided molybdenite with an alkali metal fluoride in an inert atmosphere to decompose silicates in the molybdenite to volatile silicon fluoride and leaving water soluble salts, washing the calcined molybdenite with water to remove water soluble salts, thereby producing relatively pure molybdenum disulfide powder, thoroughly admixing 100 parts by weight of the finely divided, purified molybdenum disulfide with from 150 to 200 parts by weight of an organic liquid composition, the organic liquid composition comprising essentially 95% to 99.5% by weight of a readily volatilized organic solvent and the balance being a relatively non-volatile oily liquid dissolved in the solvent, the oily liquid being selected from the group consisting of petroleum oil, silicone oil and liquid esters having a boiling point of over 250° C. and a vapor pressure of less than 1 mm. at 50° C., terminating the admixing and settling out the finely divided molybdenum disulfide, decanting the organic liquid composition to leave a residue comprising a fraction of the liquid composition and the finely divided molybdenum disulfide, and evaporating the organic solvent from the residue, thereby producing a dry powder comprising the finely divided molybdenum disulfide with at least 0.05% and less than 2% by weight of the oily liquid present on the particles thereof to maintain its stability when exposed to moisture.

4. A powdered solid lubricant relatively unaffected by moisture comprising, in combination, highly purified, finely divided molybdenum disulfide and from 0.05% to less than 2% of the weight of the molybdenum disulfide of petroleum oil, the oil so applied and distributed over the particles of molybdenum disulfide that the mixture has the appearance of a dry powder.

5. A powdered solid lubricant relatively unaffected by moisture comprising, in combination, highly purified, finely divided molybdenum disulfide and from 0.05% to less than 2% of the weight of the molybdenum disulfide of an oily liquid selected from the group consisting of petroleum oil, silicone oil and liquid esters having a boiling point of over 250° C. and a vapor pressure of less than 1 mm. of mercury at 50° C., the oily liquid so applied and distributed over the particles of molybdenum disulfide that the mixture has the appearance and properties of a dry powder.

References Cited in the file of this patent

UNITED STATES PATENTS

| Number | Name | Date |
| --- | --- | --- |
| 1,756,772 | Weisberg et al. | Apr. 29, 1930 |
| 2,367,946 | Kaercher | Jan. 23, 1945 |
| 2,423,449 | Heald et al. | July 8, 1947 |

OTHER REFERENCES

Molybdenum Disulfide as a Lubricant, by Climax Molybdenum Company, 500 Fifth Ave., New York, N. Y. Copy in Scientific Library.